US009459429B2

(12) United States Patent
Asano

(10) Patent No.: US 9,459,429 B2
(45) Date of Patent: Oct. 4, 2016

(54) LENS APPARATUS AND IMAGE CAPTURING APPARATUS INCLUDING THE SAME

(71) Applicant: CANON KABUSHIKI KAISHA, Tokyo (JP)

(72) Inventor: Kota Asano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 13/867,942

(22) Filed: Apr. 22, 2013

(65) Prior Publication Data
US 2013/0286489 A1 Oct. 31, 2013

(30) Foreign Application Priority Data

Apr. 27, 2012 (JP) .................................. 2012-103231

(51) Int. Cl.
*G02B 15/14* (2006.01)
*G02B 7/20* (2006.01)
*G03B 9/02* (2006.01)

(52) U.S. Cl.
CPC .. *G02B 7/20* (2013.01); *G03B 9/02* (2013.01)

(58) Field of Classification Search
CPC .......... G03B 9/02; G03B 9/06; G03B 7/003; G02B 5/005; G02B 7/20
USPC .................................. 359/676–706, 822–826
See application file for complete search history.

(56) References Cited

U.S. PATENT DOCUMENTS 7,177,539 B2 * 2/2007 Ito .......................... G02B 7/023
359/823

FOREIGN PATENT DOCUMENTS

| JP | 11-160754 A | 6/1999 |
| JP | 2003-107556 A | 4/2003 |
| JP | 2004-219473 A | 8/2004 |
| JP | 2005-223797 A | 8/2005 |
| JP | 2006-243372 A | 9/2006 |
| JP | 2012-003083 A | 9/2006 |
| JP | 2007-199578 A | 8/2007 |
| JP | 2009-063702 A | 3/2009 |
| JP | 2009063702 A * | 3/2009 |
| JP | 2011-164226 A | 8/2011 |
| JP | 2012-013896 A | 1/2012 |

* cited by examiner

Primary Examiner — Mahidere Sahle
(74) Attorney, Agent, or Firm — Canon U.S.A., Inc., IP Division

(57) ABSTRACT

A lens apparatus includes a diaphragm unit that is driven in a first driving direction and a second driving direction, a driving unit that drives the diaphragm unit based on a driving instruction, a storage unit that stores a first driving instruction value for performing the driving in the first driving direction, and a second driving instruction value for performing the driving in the second driving direction, and a control unit that outputs a driving instruction for driving the diaphragm unit, wherein the control unit outputs, when driving the diaphragm unit in the first driving direction, the driving instruction based on the first driving instruction value or the like, and outputs, when driving the diaphragm unit in the second driving direction, the driving instruction based on the second driving instruction value or the like.

9 Claims, 8 Drawing Sheets

FIG. 4A

| F$_{ncCLOSE}$ | 1.0 | 1.0 | 2.0 | 2.9 | 3.8 | 4.8 | 5.8 | 6.7 | 7.7 | 8.6 | 9.5 | 10.5 |
|---|---|---|---|---|---|---|---|---|---|---|---|---|
| DRIVING INSTRUCTION VALUE | S1 | S2 | S3 | S4 | S5 | S6 | S7 | S8 | S9 | S10 | S11 | S12 |

FIG. 4B

| $F_{noCLOSE}$ | 1.0 | 1.0 | 2.0 | 2.9 | 3.8 | 4.8 | 5.8 | 6.7 | 7.7 | 8.6 | 9.5 | 10.5 |
|---|---|---|---|---|---|---|---|---|---|---|---|---|
| $F_{noOPEN}$ | 1.8 | 2.7 | 3.8 | 4.9 | 6.0 | 7.0 | 8.3 | 9.7 | 11.0 | 11.0 | 11.0 | 11.0 |
| DRIVING INSTRUCTION VALUE | S1 | S2 | S3 | S4 | S5 | S6 | S7 | S8 | S9 | S10 | S11 | S12 |

FIG. 4C

| F$_{noCLOSE}$ | 1.0 | 1.0 | 2.0 | 2.9 | 3.8 | 4.8 | 5.8 | 6.7 | 7.7 | 8.6 | 9.5 | 10.5 |
|---|---|---|---|---|---|---|---|---|---|---|---|---|
| F$_{noOPEN}$ | 1.8 | 2.7 | 3.8 | 4.9 | 6.0 | 7.0 | 8.3 | 9.7 | 11.0 | 11.0 | 11.0 | 11.0 |
| TARGET APERTURE VALUE | 1.0 | 2.0 | 3.0 | 4.0 | 5.0 | 6.0 | 7.0 | 8.0 | 9.0 | 10.0 | 11.0 | 12.0 |
| DRIVING INSTRUCTION VALUE | S1 | S2 | S3 | S4 | S5 | S6 | S7 | S8 | S9 | S10 | S11 | S12 |

FIG. 4D

| Fno CLOSE | 1.0 | 1.0 | 2.0 | 2.9 | 3.8 | 4.8 | 5.8 | 6.7 | 7.7 | 8.6 | 9.5 | 10.5 |
|---|---|---|---|---|---|---|---|---|---|---|---|---|
| Fno OPEN | 1.8 | 2.7 | 3.8 | 4.9 | 6.0 | 7.0 | 8.3 | 9.7 | 11.0 | 11.0 | 11.0 | 11.0 |
| TARGET APERTURE VALUE | 1.0 | 2.0 | 3.0 | 4.0 | 5.0 | 6.0 | 7.0 | 8.0 | 9.0 | 10.0 | 11.0 | 12.0 |
| DRIVING INSTRUCTION VALUE | S1 | S2 | S3 | S4 | S5 | S6 | S7 | S8 | S9 | S10 | S11 | S12 |
| FIRST DRIVING INSTRUCTION VALUE | S2 | S3 | S4 | S5 | S6 | S7 | S8 | S9 | S10 | S12 | S13 | ... |
| SECOND DRIVING INSTRUCTION VALUE | S1 | S1 | S2 | S3 | S4 | S5 | S6 | S7 | S7 | S8 | S9 | ... |

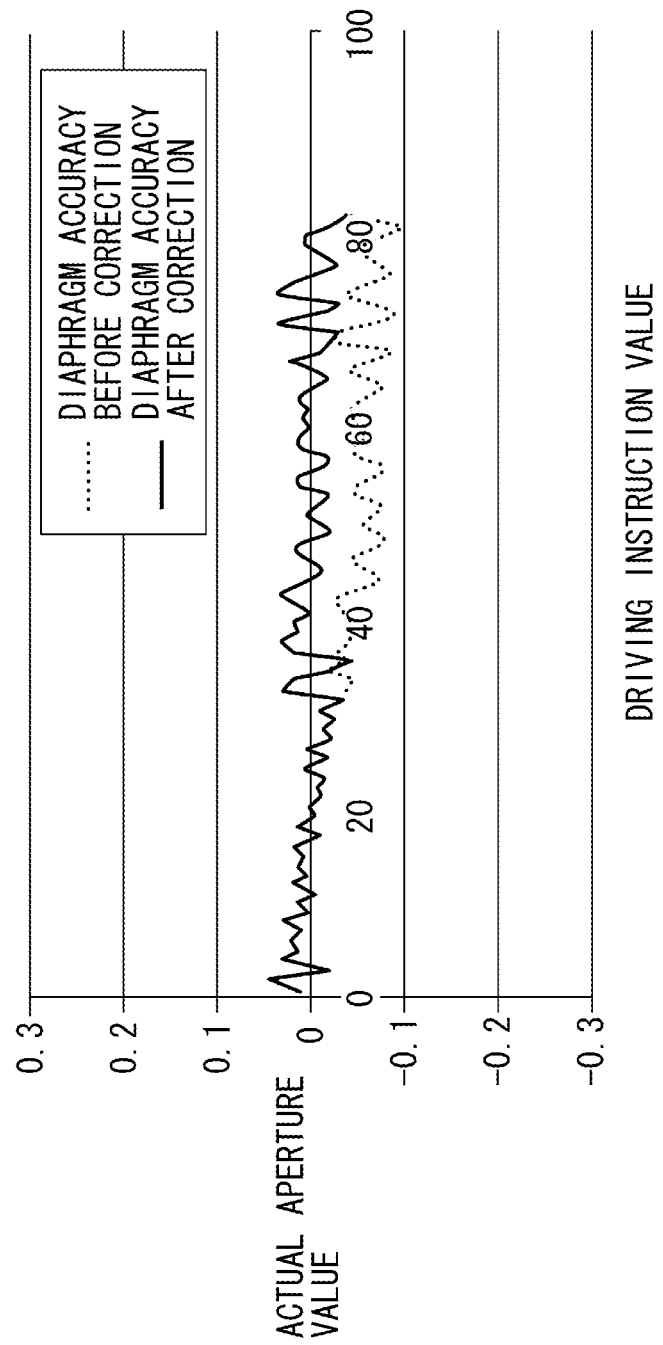

LENS APPARATUS AND IMAGE CAPTURING APPARATUS INCLUDING THE SAME

BACKGROUND OF THE INVENTION

1. Field of the Invention

The present invention relates to a lens apparatus equipped with a diaphragm mechanism, and an image capturing apparatus including the lens apparatus, which is suitable for, for example, an interchangeable-lens digital single-lens reflex camera, a digital still camera, a digital video camera, and an interchangeable-lens digital video camera.

2. Description of the Related Art

A diaphragm mechanism (a diaphragm unit) serves to change the size of a diaphragm aperture formed by a plurality of diaphragm blades, and to increase or decrease the amount of light passing through the diaphragm aperture by moving the plurality of diaphragm blades in opening and closing directions using an actuator such as a stepping motor.

Recently, in an interchangeable-lens digital single-lens reflex camera, the number of continuous shots in still image shooting has been one of the barometers for evaluating the performance as a camera system and it becomes important to cope with high-speed operation of a diaphragm mechanism. Here, when a driving force of an actuator is transmitted to diaphragm blades and the diaphragm is opened or closed, the variation in diaphragm accuracy or hysteresis in driving conversion occurs by the influence from mechanical backlash between the parts in the diaphragm mechanism or the variation in step accuracy of a stepping motor.

The reason is because, if the mechanical backlash is completely removed, when a sliding resistance is increased due to overlapping of a plurality of diaphragm blades, bending of the diaphragm blades, or thermal contraction of the components, the risk of malfunction occurs.

A following countermeasure is taken as control of a diaphragm mechanism focusing on the diaphragm accuracy rather than the number of continuous shots. The diaphragm mechanism is controlled to have each target aperture value by, after aperture opening operation in which an aperture diameter is a fixed diameter, measuring light in the open state and performing driving in the same direction from the open side to a small aperture side. Accordingly, in the operation of the diaphragm mechanism to the target aperture values, it is required to perform the aperture opening operation on the diaphragm mechanism each time and, there is a limit in coping with a high-speed operation of the diaphragm mechanism.

For example, as a measure of improving diaphragm accuracy, Japanese Patent Application Laid-Open No. 11-160754 discusses that swing of diaphragm blades during diaphragm operation is prevented by disposing a pressing spring for each diaphragm blade and maintaining pressure on the cam followers formed at the blades with the springs against the cam.

Further, Japanese Patent Application Laid-Open No. 2007-199578 discusses that the position difference in diaphragm accuracy is improved by pressing a windmill to a restricting portion that restricts the rotational center of the windmill formed on a diaphragm ground plate.

Accordingly, diaphragm accuracy or hysteresis in driving reversal may be reduced.

However, in the related art discussed in the patent applications described above, the diaphragm accuracy and the position difference are improved, while operational load is increased when the diaphragm blades are opened and closed. Accordingly, it is remarkably difficult to cope with high-speed operation of the diaphragm mechanism for securing the number of continuous shots.

SUMMARY OF THE INVENTION

The present invention is directed to a lens apparatus including a diaphragm unit that can achieve both of diaphragm accuracy and high-speed operation, and an image capturing apparatus including the same.

According to an aspect of the present invention, a lens apparatus includes a diaphragm unit configured to be driven in a first driving direction from an open side to a small aperture side and a second driving direction from the small aperture side to the open side, a driving unit configured to drive the diaphragm unit based on a driving instruction, a control unit configured to output a driving instruction for driving the diaphragm unit from a current aperture value to a target aperture value to the driving unit, and a storage unit configured to store a first driving instruction value that is used for driving the diaphragm unit in the first driving direction and corresponds to the target aperture value, and a second driving instruction value that is used for driving the diaphragm unit in the second driving direction and corresponds to the target aperture value, wherein the control unit outputs, when driving the diaphragm unit in the first driving direction, the driving instruction based on the target aperture value, the current aperture value, and the first driving instruction value to the driving unit, and outputs, when driving the diaphragm unit in the second driving direction, the driving instruction based on the target aperture value, the current aperture value, and the second driving instruction value to the driving unit.

According to exemplary embodiments of the present invention, it is possible to provide a lens apparatus including a diaphragm unit that can achieve both of diaphragm accuracy and high-speed operation, and an image capturing apparatus including the same.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A is a table illustrating a relation between the aperture value and the driving instruction value according to the second exemplary embodiment of the present invention.

FIG. 4B is a table illustrating a relation between the aperture value and the driving instruction value according to the second exemplary embodiment of the present invention.

FIG. 4C is a table illustrating a relation between the aperture value and the driving instruction value according to the second exemplary embodiment of the present invention.

FIG. 4D is a table illustrating a relation between the aperture value and the driving instruction value according to the second exemplary embodiment of the present invention.

FIG. 5 is a graph illustrating diaphragm accuracy before and after correction according to the second exemplary embodiment of the present invention.

DESCRIPTION OF THE EMBODIMENTS

Various exemplary embodiments, features, and aspects of the invention will be described in detail below with reference to the drawings.

Figure 2:
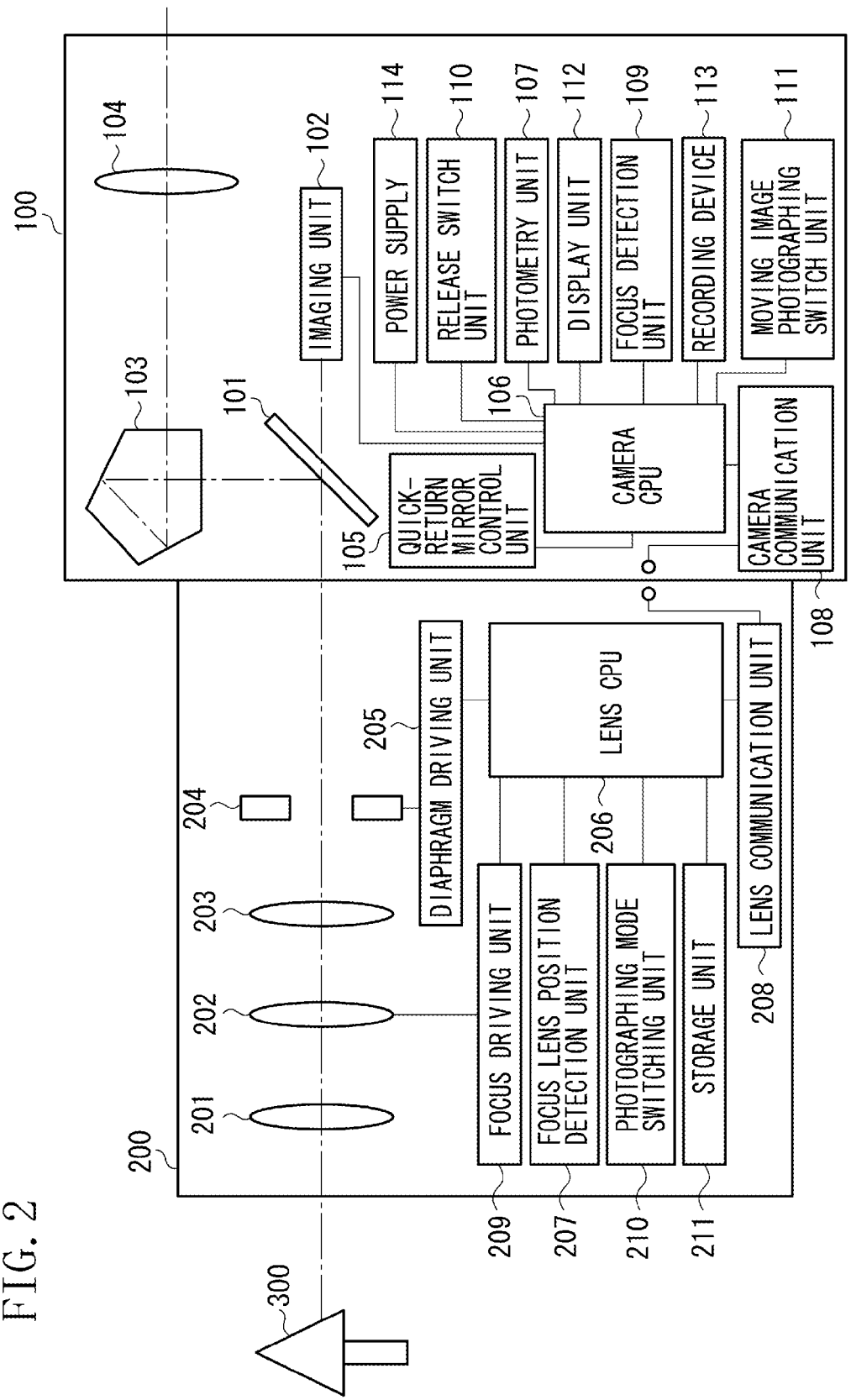
FIG. 2 is a block diagram illustrating a configuration of an optical apparatus according to exemplary embodiments of the present invention.

Hereinafter, a first exemplary embodiment will be described. FIG. 2 is a block diagram illustrating a configuration of an interchangeable-lens single-lens reflex camera as an image capturing apparatus (including a lens apparatus and a camera apparatus connected with the lens apparatus) according to the exemplary embodiments of the present invention. Further, in the exemplary embodiment, although an image capturing apparatus (an optical apparatus) including an interchangeable lens and a camera main body is described, an interchangeable lens single body (a lens apparatus) equipped with a diaphragm mechanism (a diaphragm unit) may be used as the optical apparatus. In addition, in the exemplary embodiment, although an interchangeable-lens single-lens reflex camera is described, the present exemplary embodiment may also be applied to a lens-integrated camera.

In FIG. 2, an interchangeable lens 200 is an interchangeable lens attachable/detachable to/from a camera main body 100. An optical apparatus is configured by the camera main body 100 and the interchangeable lens 200. The interchangeable lens 200 includes a front lens unit 201, a focus lens unit 202, a variator lens unit 203, and a diaphragm mechanism 204. An photographic optical system includes the lens units 201 to 203 and the diaphragm mechanism 204.

The diaphragm mechanism 204 includes a plurality of diaphragm blades (not illustrated), an opening/closing mechanism (not illustrated) that opens/closes the plurality of diaphragm blades, and a diaphragm driving unit 205 driving the opening/closing mechanism as a driving unit. The diaphragm mechanism 204 is an iris diaphragm forming a diaphragm aperture on an optical axis with some of the plurality of diaphragm blades disposed around the optical axis being overlapped. An aperture value increases or decreases in accordance with the positions of the plurality of diaphragm blades, and the overlap amount of the plurality of diaphragm blades and operational load applied to the diaphragm driving unit 205 are changed in accordance with the positions of the plurality of diaphragm blades. In general, the operational load is large at the side where the aperture value is large, in other words, the side where the overlap amount of the plurality of diaphragm blades increases. The diaphragm driving unit 205 includes a stepping motor, and the driving of the diaphragm driving unit 205 is controlled by a lens central processing unit (CPU) 206 as a control unit of the present exemplary embodiment which is described below. Further, the diaphragm mechanism 204 includes a diaphragm position detection unit (not illustrated) as an actual aperture value measuring unit that detects the positions of the plurality of diaphragm blades corresponding to the aperture values. In the exemplary embodiment, although the diaphragm position detection unit is provided in consideration of the time when an unexpected situation, such as a shock, occurs, open control by pulse count of the stepping motor may be performed. The diaphragm mechanism 204 can be driven in a first driving direction from an open side to a small aperture side, and a second driving direction from the small aperture side to the open side.

A focus position detection unit 207 detects the position of the focus lens unit 202. The lens CPU 206 transmits and receives various items of information, through a camera CPU 106, a lens communication unit 208, and a camera communication unit 108, and controls the entire operation of the interchangeable lens 200 integrally with the camera CPU 106.

The focus driving unit 209 includes a stepping motor or a vibration motor, and moves the focus lens unit 202 on the optical axis, using a focus driving mechanism (not illustrated). The lens CPU 206 controls driving (a rotational direction and a driving instruction value) of the focus driving unit 209. Specifically, the lens CPU 206 controls the driving direction of the focus driving unit 209 by changing the polarity of a focus driving signal applied to the focus driving unit 209, and controls a driving instruction value of the focus driving unit 209 by increasing/decreasing the number of pulses of the focus driving signal. Accordingly, the amount of movement of the focus lens unit 202 on the optical axis is controlled. The CPU 206 refers to the focus position information obtained from the focus lens position detection unit 207.

Further, the lens CPU 206 controls driving (a rotational direction and a driving instruction value) of the diaphragm driving unit 205. Specifically, the lens CPU 206 controls the driving direction of the diaphragm driving unit 205 by changing the polarity of a diaphragm driving signal applied to the diaphragm driving unit 205, and controls a driving instruction value of the diaphragm driving unit 205 by increasing/decreasing the number of pulses of the diaphragm driving signal. Accordingly, the amount of opening/closing of the plurality of diaphragm blades in the diaphragm mechanism 204 is controlled. The lens CPU 206 refers to the diaphragm position information (a current aperture value) obtained from the diaphragm position detection unit.

A photographing mode switching unit 210 is operated by a user to switch a still image shooting mode and a moving image shooting mode. In the exemplary embodiment, although the photographing mode switching unit 210 is provided for the interchangeable lens 200, the photographing mode switching unit 210 may be included in the camera main body 100. A memory 211 includes a read-only memory (ROM) as a storage unit of the present exemplary embodiment. The memory 211 stores a plurality of driving instruction values of the focus lens unit 202. Further, the memory 211 also stores respective data of target aperture values and actual aperture values for the plurality of driving instruction values corresponding to the driving direction of the diaphragm mechanism 204. The driving direction of the diaphragm mechanism 204 includes a first driving direction from the open side to the small aperture side, and a second driving direction from the small aperture side to the open side. The driving instruction value of the diaphragm mechanism 204 is a value that instructs driving to a predetermined diaphragm position, that is, a first driving instruction value used for driving in the first driving direction, and a second driving instruction value used for driving in the second driving direction. That a correction value $Y_N$ is obtained from the relationship between a target aperture value and an actual aperture value in the diaphragm mechanism 204 and used in control of the diaphragm mechanism 204 will be described below.

The lens CPU 206 can read out any time the data stored in the memory 211. An object light from an object 300 enters the camera main body 100 through a photographic optical system in the interchangeable lens 200. In the camera main body 100, an object image is formed on an imaging unit 102 by the object light with a quick-return mirror 101 out of an optical path.

The imaging unit 102 includes a photoelectric conversion element, such as a charge-coupled device (CCD) sensor or a complementary metal-oxide semiconductor (CMOS) sensor, and photoelectrically converts an object image. Further, when the quick-return mirror 101 is disposed in the optical path, the object light is reflected on the quick-return mirror 101 and guided to a pentaprism 103. The object light reflected on the pentaprism 103 is guided to user's eyes through a finder optical system 104. Thus, the image can be made visible to the user. A quick-return mirror control unit 105 controls up/down movement of the quick-return mirror 101 in response to a control signal from the camera CPU 106. A photometry unit 107 calculates object luminance from an output signal of the imaging unit 102 or a video signal generated by an image processing circuit (not illustrated), which is described below, and outputs the calculated object luminance to the camera CPU 106 as photometry information.

In the still image shooting mode, a focus detection unit 109, detects a focus state of the photographic optical system in a phase difference detection method, using the object light reflected on a sub-mirror (not illustrated) disposed behind the quick-return mirror 101. Further, the focus detection unit 109 outputs focus information indicating the focus state to the camera CPU 106. The camera CPU 106 controls the position of the focus lens unit 202 via the focus driving unit 209 and obtains an in-focus state, based on the focus information.

Further, in the moving image shooting mode, the camera CPU 106 generates contrast information indicating the contrast state of a video from a video signal generated by the image processing circuit described below. In addition, the camera CPU 106 obtains an in-focus state by controlling the position of the focus lens unit 202 based on the contrast information.

Further, the camera CPU 106 calculates an aperture value that is to be set on the diaphragm mechanism 204 or the operation speed of a photometry (not illustrated) for controlling the exposure amount of the imaging unit 102 in the still image shooting mode, based on the photometry information.

A release switch unit 110 outputs a signal of a switch SW1 when half-pressed by a user (the switch SW1 ON), and outputs a signal of a switch SW2 when full-pressed (the switch SW2 ON).

The camera CPU 106 starts to prepare still image shooting operation, such as measuring light and focus detection, in response to input of the signal of the switch SW1, and starts still image shooting operation for recording in response to input of the signal of the switch SW2. A moving image photographing switch unit 111 that alternately outputs a moving image shooting start signal and a moving image shooting stop signal every time the mode is operated by the user. The camera CPU 106 starts a moving image shooting operation for recording in response to the moving image shooting start signal, and stops the shooting operation in response to input of the moving image shooting stop signal.

Further, in the exemplary embodiment, although the moving image photographing switch mode 111 and the release switch unit 110 are separately provided, the release switch unit 110 may have the function of the moving image photographing switch unit. A digital video signal is generated by performing various image processing such as amplification in the image processing circuit on a photographing signal output from the imaging unit 102.

The camera CPU 106 generates a still image for recording, a moving image for displaying, and a moving image for recording, using the digital video signals. The moving image for displaying is displayed as an electronic viewfinder image on a display unit 112 including a display device such as a liquid crystal display (LCD) panel. The still image for recording and the moving image for recording are recorded on a recording medium such as semiconductor memory in a recording device 113.

Next, obtaining the correction value $Y_N$ from the relationship between a target aperture value and an actual aperture value at a driving instruction value in the driving direction of the diaphragm mechanism 204 of the first exemplary embodiment, and controlling the diaphragm mechanism 204 using the obtained correction value $Y_N$ will be described. In a driving instruction value in the driving direction in the diaphragm mechanism 204 and given to the diaphragm driving unit 205 from the lens CPU 206, a target aperture value and an actual aperture value measured in advance are stored in the memory 211. The driving instruction value means a first driving instruction value used for driving in the first driving direction, and a second driving instruction value used for driving in the second driving direction.

The lens CPU 206 (the control unit) controls, when driving the diaphragm mechanism 204 (the diaphragm unit) in the first driving direction, the diaphragm driving unit 205 by outputting a driving instruction based on the target aperture value, the current aperture value, and the first driving instruction value to the diaphragm driving unit 205 (the driving unit). Further, the lens CPU 206 controls, when driving the diaphragm mechanism 204 (the diaphragm unit) in the second driving direction, the diaphragm driving unit 205 by outputting a driving instruction based on the target aperture value, the current aperture value, and the second driving instruction value to the diaphragm driving unit 205 (the driving unit).

In the exemplary embodiment, an example of one-direction driving from the open side to the small aperture side (a one-direction driving example in the first driving direction) will be described.

First, an average value of difference $A_N$ is obtained by the following equation from the relationship between the target aperture value and the actual aperture value, which are stored in advance in the memory 211, at the driving instruction value in the driving direction of the diaphragm mechanism 204.

$$A_N = \{(Fno_{R1} - Fno_{M1})/(S_1 - S_0) + (Fno_{R2} - Fno_{M2})/(S_2 - S_1) + \ldots + (Fno_{RN} - Fno_{MN})/(S_N - S_{N-1})\}/N$$

Parameters are as follows.

$A_N$: Average value of difference between a target aperture value and an actual aperture value between adjacent driving instruction values $Fno_{RN}$: Actual aperture value for $S_N$ $Fno_{MN}$: Target aperture value for $S_N$ $S_N$: N-th driving instruction value $S_{N-1}$: N−1-th driving instruction value Next, the correction value $Y_N$ is obtained by the following equation.

$$Y_N = A_N \times S_N \text{ (}N \text{ is 1 or more integer)}$$

Figure 3:
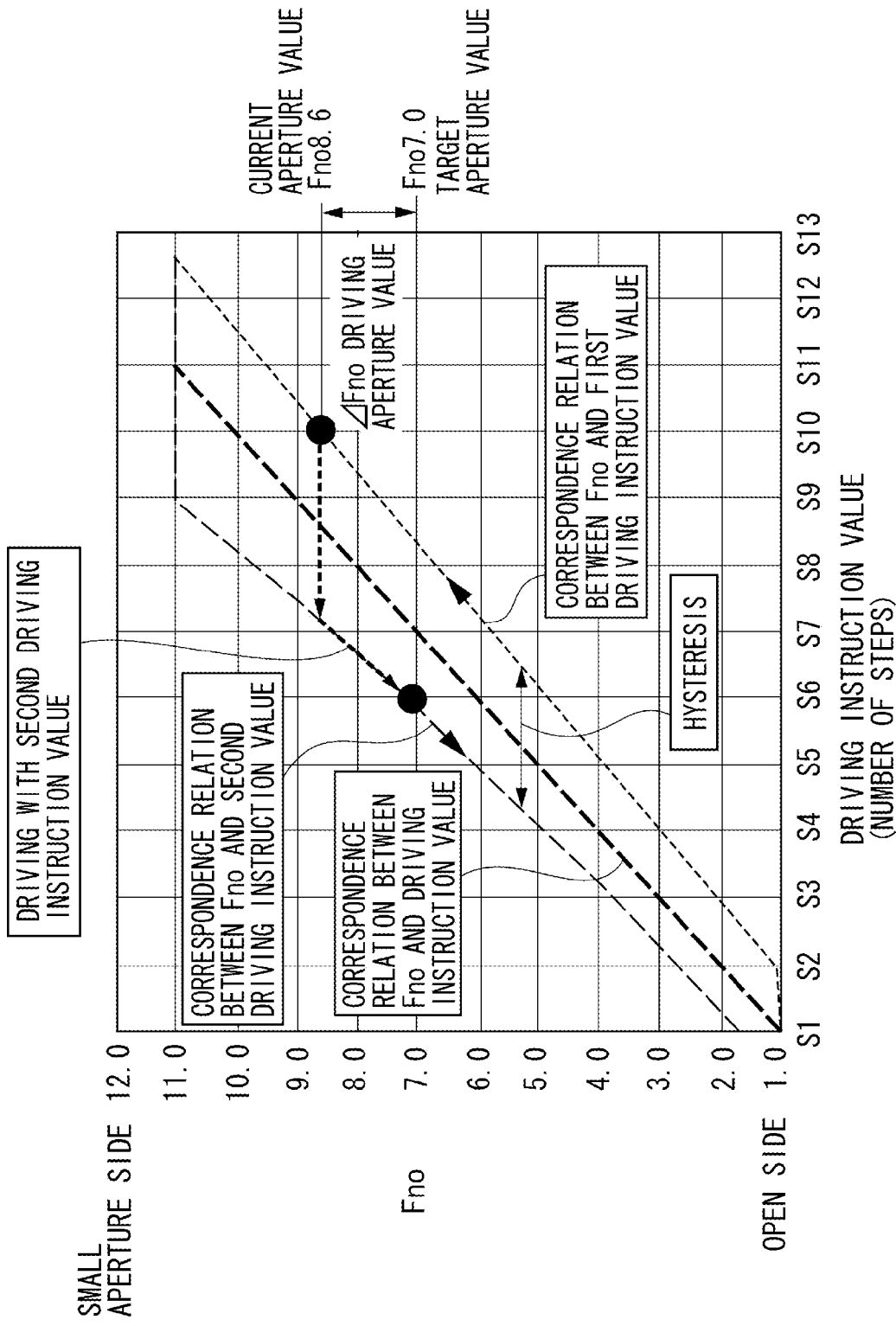
FIG. 3 is a diagram illustrating a relation between an aperture value and a driving instruction value according to a second exemplary embodiment of the present invention.

Updated driving instruction values $S_{+Y1}, S_{+Y2}, \ldots, S_{+YN}$ (N is 1 or more integer) are stored for the diaphragm mechanism 204 in the memory 211, by obtaining the obtained correction values $Y_1, Y_2, \ldots, Y_N$ (N is 1 or more integer) for each of the driving instruction values $S_1, S_2, \ldots, S_N$ (N is 1 or more integer) in the driving direction, and adding the correction values $Y_1, Y_2, \ldots, Y_N$ (N is 1 or more integer) (that is, driving instruction values corresponding to the correction values $Y_1, Y_2, \ldots, Y_N$ (N is an integer equal to or more than 1)) to the driving instruction values $S_1, S_2, \ldots, S_N$ (N is 1 or more integer) stored in advance in the driving direction. Thereafter, the diaphragm mechanism 204 is operated with the new driving instruction values $S_{+Y1}, S_{+Y2}, \ldots, S_{+YN}$ (N is 1 or more integer). The driving instruction value corresponding to the above-mentioned correction value $Y_N$ is obtained from the target aperture value at the driving instruction value in the driving direction of the diaphragm mechanism 204. In other words, the target aperture value is a correspondence relation between the driving instruction value and the target aperture value. For example, the correspondence relation is illustrated in FIG. 3 as a correspondence relation between an aperture value Fno and the driving instruction value. The driving instruction value corresponding to the correction value $Y_N$ (a deviation amount of the aperture value to be corrected) is obtained from the inclination of the correspondence relation (straight line).

Figure 1:
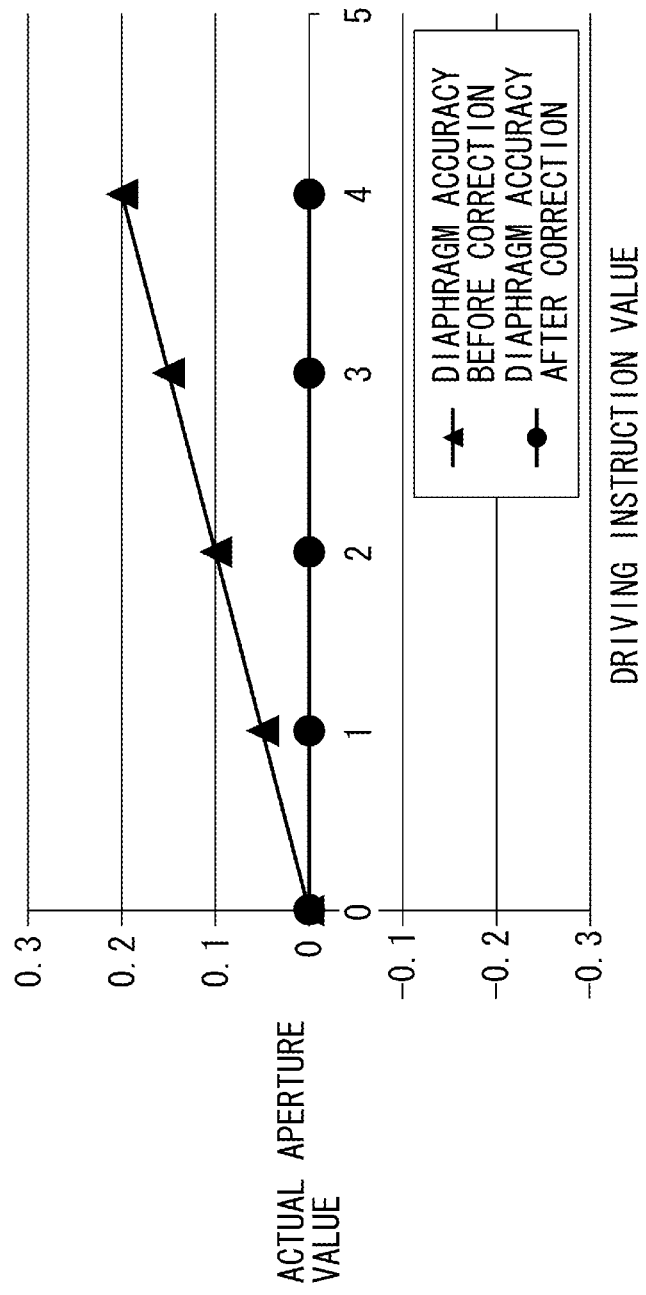
FIG. 1 is a graph illustrating diaphragm accuracy before and after correction according to a first exemplary embodiment of the present invention.

FIG. 1 illustrates an example when the correction values $Y_1, Y_2, \ldots, Y_N$ (N is 1 or more integer) are applied to the diaphragm mechanism 204 according to the first exemplary embodiment. In FIG. 1, the vertical axis indicates an actual aperture value, and the graph indicates that, as the error in the + direction increases, the aperture value decreases (the amount of light passing through a diaphragm aperture increases), and, as the error in the − direction increases, the aperture value increases (the amount of light passing through the diaphragm aperture decreases). Further, the horizontal axis indicates a driving instruction value in the driving direction from the open side to the small aperture side, and the zero line in the vertical axis indicates a target aperture value. As for the graph indicating diaphragm accuracy before correction, when the diaphragm mechanism 204 is driven from the open side to the small aperture side, it can be recognized that, as the driving instruction value is increased, the actual aperture value has an error in the direction in which the aperture value decreases from the target aperture value.

Further, in the graph indicating diaphragm accuracy after correction in which the diaphragm mechanism 204 has been driven using the correction values $Y_1, Y_2, \ldots, Y_N$ (N is 1 or more integer), the diaphragm mechanism with high accuracy substantially equal to the target aperture value is implemented.

Since the correction values $Y_1, Y_2, \ldots, Y_N$ (N is 1 or more integer) are obtained in the driving direction, the description is not repeated in the exemplary embodiment. However, obtaining the correction values $Y_N$ may be applied in the same way to those in the driving direction (the second driving direction) from the small aperture side to the open side.

Further, in the memory 211, information of any one of position differences, a driving frequency, temperature information, a limited driving amount, and a limited driving range is stored and may be read out at any time, for the relationship between the driving instruction value and the actual aperture value in the driving direction of the diaphragm mechanism 204.

The limited driving amount will be described hereafter. The limited driving amount becomes effective when the difference in driving instruction value from the driving instruction value of the current aperture value as the first position in the present exemplary embodiment to the driving instruction value of the next aperture value as the second position in the present exemplary embodiment driven by the diaphragm driving unit 205 is smaller than a predetermined driving instruction value.

For example, the limited driving amount is effective when setting a range, where the aperture value is not changed even if the diaphragm mechanism 204 is driven, to the range of mechanical backlash generated in driving conversion of the diaphragm mechanism 204. In other words, when the driving instruction value of the diaphragm mechanism 204 from the memory 211 to the diaphragm driving unit 205 is a driving instruction value not more than the limited driving amount, the lens CPU 206 does not drive the diaphragm mechanism 204.

The limited driving range is a parameter that is applied when the driving instruction value at the current aperture value of the diaphragm mechanism 204 is a driving instruction value around a fixed aperture diameter in the diaphragm open state. Since the aperture value around the fixed aperture diameter in the diaphragm open state is more advantageous in terms of light measurement accuracy than that of the aperture diameter formed by a plurality of diaphragm blades, it is set for driving in the first driving direction according to the present invention, that is, from the open side to the small aperture side, at a targeted aperture value after opening operation is performed one time around the opening of diaphragm.

For example, accuracy is improved in terms of diaphragm accuracy including light measurement accuracy, by setting the range from the opening of diaphragm to a first level as the limited driving range. Although there may be a problem in the number of continuous shots, it is possible to set the value to be equivalent to all the driving instruction values from the opening to the small aperture, as long as it is from the opening of diaphragm to a middle level. Thus, there is no influence and light measurement accuracy may be improved.

Further, the lens CPU 206 performs driving control of the diaphragm mechanism 204 in the relationship between the driving instruction value and the actual aperture value of the diaphragm mechanism 204 in the driving direction of the diaphragm mechanism 204 stored in the memory 211, based on the position difference, the driving frequency, and the temperature information. Therefore, the correction values $Y_1, Y_2, \ldots, Y_N$ (N is 1 or more integer) can be applied even under the environment with a position difference, various driving frequencies, and temperatures.

As described above, it is possible to directly operate the diaphragm mechanism at a target aperture value without taking a conventional control method of a diaphragm mechanism that focuses on the diaphragm accuracy rather than the number of continuous shots and operates the diaphragm mechanism in the same direction by performing opening operation every time. Accordingly, it is possible to accomplish a diaphragm mechanism that can achieve diaphragm accuracy and high-speed operation.

By applying the exemplary embodiment, it is possible to achieve the number of continuous shots substantially double compared with that of the related art, for high-speed operation. In the exemplary embodiment, although the correction values $Y_1, Y_2, \ldots, Y_N$ (N is 1 or more integer) are obtained from the driving instruction values from 0 to 4 in FIG. 1, the correction values may be calculated between two points (taking 4 of N as 1, that is, 0 and 4) without calculating from adjacent driving instruction values.

Hereinafter, a second exemplary embodiment will be described. FIG. 2 is a block diagram illustrating a configuration of an interchangeable-lens single-lens reflex camera as an optical apparatus according to the exemplary embodiment of the present invention. The configuration is the same as that of the first exemplary embodiment and thus will not be repeated. Obtaining a new driving instruction value $S_{Select\ Y}$ from the relationship between a target aperture value and an actual aperture value at a driving instruction value in the driving direction of a diaphragm mechanism according to the second exemplary embodiment and controlling the diaphragm mechanism using the new driving instruction value $S_{Select\ Y}$ will be described. In a driving instruction value of the diaphragm mechanism 204 in the driving direction given to the diaphragm driving unit 205 from the lens CPU 206, a target aperture value is stored in the memory 211.

First, an example of a method for obtaining corrected driving instruction values (new driving instruction values $S_{Select\ Y}$) in a driving direction (a first driving direction) from an open side to a small aperture side and a driving direction (a second driving direction) from the small aperture side to the open side will be described. First, actual aperture values ($Fno_{CLOSE}$) corresponding to driving instruction values in the driving direction (the first driving direction) from the open side to the small aperture side of the diaphragm mechanism 204 are measured and stored in the memory 211 (refer to FIGS. 3 and 4A).

Next, actual aperture values ($Fno_{OPEN}$) according to driving instruction values $S_1, S_2, \ldots, S_N$ (N is 1 or more integer) in the driving direction (second driving direction) from the small aperture side to the open side of the diaphragm mechanism 204 are measured and stored in the memory 211 (refer to FIGS. 3 and 4B). Actual aperture values $Fno_{CLOSE}$ and the actual aperture values $Fno_{OPEN}$ each corresponding the driving instruction values $S_1, S_2, \ldots, S_N$ (N is 1 or more integer) of the diaphragm mechanism 204 in the respective driving directions, and the target aperture values (for the driving instruction values of the diaphragm mechanism 204 in the respective driving directions) stored in the memory 211 are compared (refer to FIG. 4C). In FIG. 4C, the target aperture value corresponding to the driving instruction value of the diaphragm mechanism 204 is used in common in the first and second driving directions. Further, a driving instruction value for the actual aperture value with the minimum absolute value of a difference between the values (the actual aperture values $Fno_{CLOSE}$ or the actual aperture values $Fno_{OPEN}$, and the target aperture values) is extracted, and the extracted driving instruction value is selected as the driving instruction value for the target aperture value. The driving instruction value for the actual aperture value with the minimum absolute value of a difference between the actual aperture value $Fno_{CLOSE}$ and the target aperture value is the driving instruction value (the first driving instruction value) for the target aperture value in the driving direction (the first driving direction) from the open side to the small aperture side of the diaphragm mechanism 204 (refer to FIG. 4D). For example, in FIGS. 3 and 4C, if the target aperture value is set to 9.0, when the absolute value of a difference is minimum, the actual aperture value $Fno_{CLOSE}$ is 8.6. The driving instruction value of S10 corresponds to the actual aperture value $Fno_{CLOSE}$ of 8.6. Thus, the driving instruction value of S10 is set as the driving instruction value (the first driving instruction value) corresponding to the target aperture value of 9.0 in driving the diaphragm mechanism 204 in the driving direction (the first driving direction) from the open side to the small aperture side (refer to FIG. 4D).

Further, the driving instruction value for the actual aperture value with the minimum absolute value of a difference between the actual aperture value $Fno_{OPEN}$ and the target aperture value is the driving instruction value (the second driving instruction value) for the target aperture value in the driving direction (the second driving direction) from the small aperture side to the open side of the diaphragm mechanism 204. The respective extracted driving instruction values for the plurality of target aperture values are selected as new driving instruction values $S_{Select\ Y}$ of the diaphragm mechanism 204 and stored in the memory 211. Thereafter, the diaphragm mechanism 204 is operated with the new driving instruction values $S_{Select\ Y}$.

That is, the first instruction values and the second instruction values stored in the storage unit are obtained by measuring actual aperture values of the diaphragm unit with an actual aperture value measuring unit, which measures the actual aperture values of the diaphragm unit, while reciprocating the diaphragm unit with the actual aperture value measuring unit based on driving instructions.

Further, the control unit compares the target aperture values with the current aperture values (the actual aperture values). When the target aperture value is in the first driving direction of the current aperture value (the actual aperture value) (in other words, the target aperture value is greater than the current aperture value), the first driving instruction value for the actual aperture value with the minimum absolute value of the difference between the target aperture value and the actual aperture value is selected as the first driving instruction value of the target aperture value. Then, the control unit 206 outputs a driving instruction to the driving unit 205 for driving the diaphragm mechanism 204 to the instructed position of the diaphragm blades based on the first driving instruction value. When the target aperture value is in the second driving direction of the current aperture value (the actual aperture value) (in other words, the target aperture value is smaller than the current aperture value), the second driving instruction value for the actual aperture value with the minimum absolute value of the difference between the target aperture value and the actual aperture value is selected as the second driving instruction value of the target aperture value. Then, the control unit 206 outputs a driving instruction to the driving unit 205 for driving the diaphragm mechanism 204 to the instructed position of the diaphragm blades based on the second driving instruction value. For example, in FIGS. 3 and 4C, assume that the target aperture value of 7.0 is compared with the current aperture value (the actual aperture value) of 8.6. In this case, the target aperture value of 7.0 is in the second driving direction of the current aperture value (the actual aperture value) of 8.6. Thus, when the actual aperture value is 7.0, the absolute value of the difference between the target aperture value of 7.0 and the actual aperture value of 8.6 is minimum. The second driving instruction value of S6 corresponding to the actual aperture value of 7.0 is set to the second driving instruction value of the target aperture value of 7.0. Then, the control unit 206 outputs a driving instruction to the driving unit 205 for driving the diaphragm mechanism 204 to the instructed position of the diaphragm blades based on the second driving instruction value of S6.

FIG. 5 illustrates an example when the new driving instruction values $S_{Select\ Y}$ are applied to the diaphragm mechanism 204. In FIG. 5, the vertical axis indicates actual aperture values, and the graph indicates that, as the error in the + direction increases, the aperture value decreases (the amount of light passing through the diaphragm aperture increases), and, as the error in the − direction increases, the aperture value increases (the amount of light passing through the diaphragm aperture decreases).

Further, the horizontal axis indicates driving instruction values in the driving direction from the open side to the small aperture side, and the zero line in the vertical axis indicates target aperture values. As for the graph indicating diaphragm accuracy before correction, when the diaphragm mechanism 204 is driven from the open side to the small aperture side, it can be seen that, as the driving instruction value is increased, the actual aperture value has an error in the direction in which the aperture value increases from the target aperture value.

Further, in the graph indicating diaphragm accuracy after correction, in which the diaphragm mechanism 204 has been driven using the new driving instruction values $S_{Select\ Y}$, a diaphragm mechanism with high accuracy close to the target aperture value is implemented. The present example illustrates that the diaphragm accuracy is already high at the time before correction, but means that it is possible to further improve the diaphragm accuracy, when using the new driving instruction values $S_{Select\ Y}$ according to the exemplary embodiment.

Further, in the memory 211, information of any one of position differences, a driving frequency, temperature information, a limited driving amount, and a limited driving range is stored and may be read out at any time, for the relationship between the driving instruction value and the actual aperture value of the diaphragm mechanism 204 in the driving direction of the diaphragm mechanism 204. The limited driving amount will be described hereafter.

The limited driving amount becomes effective when the difference in driving instruction value between the driving instruction value of the current aperture value as the first position in the present exemplary embodiment and the driving instruction value of the subsequent aperture value as the second position in the present exemplary embodiment to be driven by the diaphragm driving unit 205 is smaller than a predetermined driving instruction value. For example, the limited driving amount is effective when setting a range where the aperture value is not changed even if the diaphragm mechanism 204 is driven due to the range of mechanical backlash generated in driving conversion of the diaphragm mechanism 204.

That is, when the driving instruction value of the diaphragm mechanism 204 from the memory 211 to the diaphragm driving unit 205 is a driving instruction value not more than the limited driving amount, the diaphragm mechanism 204 is not driven. The limited driving range is a parameter that is applied, when the driving instruction value at the current aperture value of the diaphragm mechanism 204 is a driving instruction value around a fixed diaphragm diameter in the diaphragm open state.

Around the fixed aperture diameter in the diaphragm open state is more advantageous in terms of light measurement accuracy than the aperture diameter formed by a plurality of diaphragm blades. Accordingly, the limited driving range is set for driving to a targeted aperture value after opening operation is performed one time in the first driving direction according to the present exemplary embodiment, that is, from the open side to the small aperture side, around the opening of diaphragm. For example, accuracy is improved in terms of diaphragm accuracy including light measurement accuracy, by setting the range from the opening of the diaphragm to a first level as the limited driving range.

Although there may be an issue in the number of continuous shots, it is possible to set the value to be equivalent to all the driving instruction values from the opening to the small aperture, as long as the values are from the opening of the diaphragm to a middle level. Thus, there is no influence and light measurement accuracy may be improved. Further, the diaphragm driving unit 205 performs driving control of the diaphragm mechanism 204 based on the position difference, the driving frequency, and the temperature information in the relationship between the driving instruction value and the actual aperture value of the diaphragm mechanism 204 in the driving direction of the diaphragm mechanism 204 stored in the memory 211. Therefore, exemplary embodiments of the present invention can be applied even under the environment with a position difference or various driving frequencies and temperatures.

As described above, it is possible to directly operate the diaphragm mechanism at a target aperture value without taking a conventional control method of a diaphragm mechanism that focuses on the diaphragm accuracy rather than the number of continuous shots and operates the diaphragm mechanism in the same direction by performing opening operation every time. It is also possible to accomplish a diaphragm mechanism that can achieve diaphragm accuracy and a high-speed operation. By applying the exemplary embodiment, it is possible to achieve the number of continuous shots substantially double compared with that of the related art, for high-speed operation.

Further, although a stepping motor is used for the diaphragm driving unit 205 in the first exemplary embodiment and the second exemplary embodiment, the present exemplary embodiments are not limited thereto. For example, a direct current (DC) motor, a linear motor, or an ultrasonic motor may be used.

Although the exemplary embodiments of the present invention are described above, the present invention is not limited to the exemplary embodiments and may be changed and modified in various ways without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-103231 filed Apr. 27, 2012, which is hereby incorporated by reference herein in its entirety.

What is claimed is:

1. A lens apparatus comprising:
a diaphragm unit configured to be driven in a first driving direction from an open side to a small aperture side and a second driving direction from the small aperture side to the open side;
a driving unit configured to drive the diaphragm unit based on a driving instruction;
a control unit configured to output the driving instruction for driving the diaphragm unit from a current position to a target position to the driving unit; and
a storage unit configured to store a plurality of first driving instruction values that are used for driving the diaphragm unit in the first driving direction and respectively corresponds to a plurality of target aperture values,
and a plurality of second driving instruction values that are used for driving the diaphragm unit in the second driving direction and respectively corresponds to the target aperture values,
wherein the control unit outputs, when driving the diaphragm unit in the first driving direction, one of the first driving instruction values as the driving instruction to the driving unit based on the target aperture value and a current aperture value, and outputs, when driving the diaphragm unit in the second driving direction, one of the second driving instruction values as the driving instruction to the driving unit based on the target aperture value and the current aperture value.

2. The lens apparatus according to claim 1, wherein the control unit compares the target aperture value with an actual aperture value, and wherein the control unit selects, when the target aperture value is in the first driving direction of the actual aperture value, the first driving instruction value for the actual aperture value with a minimum absolute value of a difference between the target aperture value and the actual aperture value as a first driving instruction value of the target aperture value, and selects, when the target aperture value is in the second driving direction of the actual aperture value, the second driving instruction value for the actual aperture value with a minimum absolute value of a difference between the target aperture value and the actual aperture value as a second driving instruction value of the target aperture value.

3. The lens apparatus according to claim 1, wherein the control unit selects the value obtained by adding a driving instruction value corresponding to a correction value $Y_N$ calculated from $Y_N = A_N \times S_N$ (N is 1 or more integer) to N-th driving instruction values of the first driving instruction value and the second driving instruction value of the target aperture value as the first driving instruction value and the second driving instruction value of the target aperture value, where $$A_N = \{(Fno_{R1}-Fno_{m1})/(S_1-S_0)+(Fno_{R2}-Fno_{M2})/(S_2-S_1)+ \ldots +(Fno_{RN}-Fno_{MN})/(S_N-S_{N-1})\}/N$$

$S_N$: N-th driving instruction value
$S_{N-1}$: N−1-th driving instruction value
$Fno_{RN}$: Actual aperture value for $S_N$
$Fno_{MN}$: Target aperture value for $S_N$.

4. The lens apparatus according to claim 1, wherein the storage unit stores information on any one of a position difference, a driving frequency, temperature information, a limited driving amount, and a limited driving range in a relationship between the driving instruction value and the actual aperture value in a driving direction of the diaphragm unit.

5. The lens apparatus according to claim 3, wherein the control unit outputs a driving instruction according to a driving instruction value based on a position difference, a driving frequency, and temperature information in the relationship between the driving instruction value and the actual aperture value, which are stored in the storage unit, in the driving direction of the diaphragm unit to the driving unit.

6. The lens apparatus according to claim 4, wherein the control unit does not output the driving instruction to the driving unit, when a difference in the driving instruction values between the current aperture value and the target aperture value is not more than the limited driving amount.

7. The lens apparatus of claim 4, wherein, if a difference in the driving instruction values between the current aperture value and the target aperture value is within the limited driving range, the control unit outputs a driving instruction for driving the diaphragm unit in the first driving direction to the driving unit after performing an opening operation one time.

8. An image capturing apparatus comprising:
the lens apparatus; and
a camera apparatus connected with the lens apparatus,
wherein the lens apparatus comprising:
a diaphragm unit configured to be driven in a first driving direction from an open side to a small aperture side and a second driving direction from the small aperture side to the open side;
a driving unit configured to drive the diaphragm unit based on a driving instruction;
a control unit configured to output the driving instruction for driving the diaphragm unit from a current position to a target position to the driving unit; and
a storage unit configured to store a plurality of first driving instruction values that are used for driving the diaphragm unit in the first driving direction and respectively correspond to a plurality of target aperture values, and a plurality of second driving instruction values that are used for driving the diaphragm unit in the second driving direction and respectively correspond to the target aperture values, wherein the control unit outputs, when driving the diaphragm unit in the first driving direction, one of the first driving instruction values as the driving instruction to the driving unit based on the target aperture value and a current aperture value, and outputs, when driving the diaphragm unit in the second driving direction, one of the second driving instruction values as the driving instruction to the driving unit based on the target aperture value and the current aperture value.

9. A method of manufacturing a lens barrel comprising a diaphragm unit configured to be driven in a first driving direction from an open side to a small aperture side and a second driving direction from the small aperture side to the open side, a driving unit configured to drive the diaphragm unit based on a driving instruction, a control unit configured to output a driving instruction for driving the diaphragm unit from a current position to a target position to the driving unit, a storage unit configured to store a plurality of first driving instruction values that are used for driving the diaphragm unit in the first driving direction and respectively correspond to a plurality of target aperture values, and a plurality of second driving instruction values that are used for driving the diaphragm unit in the second driving direction and respectively correspond to the target aperture values, the method comprising the steps of:

measuring an actual aperture value while the driving unit reciprocates the diaphragm unit, and storing, in the storage unit, the first driving instruction values and the second driving instruction values obtained by the measuring of the actual aperture value.

* * * * *